Jan. 28, 1969  P. M. THAYER  3,424,443
APPARATUS FOR DIFFUSING GAS INTO A LIQUID
Filed April 11, 1967

INVENTOR
PAUL M. THAYER

BY
Morsell & Morsell

ATTORNEY

United States Patent Office 3,424,443
Patented Jan. 28, 1969

3,424,443
APPARATUS FOR DIFFUSING GAS INTO A LIQUID
Paul M. Thayer, Milwaukee, Wis., assignor to Water Pollution Control Corp., Milwaukee, Wis., a corporation of Wisconsin
Filed Apr. 11, 1967, Ser. No. 630,129
U.S. Cl. 261—123　　　　　　　　　　　　　2 Claims
Int. Cl. C10j 1/08

ABSTRACT OF THE DISCLOSURE

An elongated hood-like diffuser having an open bottom and adapted to be disposed horizontally in a fluid tank, the diffuser having an inlet at one end for gas under pressure and having gas release ports on opposite sides, the upper portion of the interior of the hood, which is in communication with and above the ports, being a gas chamber, and there being an elongated deflector spaced below but extending parallel to the open bottom.

BACKGROUND OF THE INVENTION

*Field of the invention*

The present invention pertains to diffusers adapted to be submerged in a liquid to continuously release gas under pressure, and is more particularly adapted for use as an air diffuser in the aeration tanks of sewage treatment plants.

*Description of the prior art*

The usual air diffuser system in an aeration tank of a sewage treatment plant comprises a diffuser header (one or more) which is disposed in a generally horizontal position and which has a row of openings (on one side or both sides, occasionally along the top or bottom) to which diffusers of various designs may be attached. These prior diffusers are susceptible to easy clogging so that reliable diffusion of air in the proper amounts and proper location is not assured. Clogging may be due to dirty air; to particles entering the passages and small ports from the inside; and may also be due to certain materials in the liquor, such as iron and calcium, which cause deposits to build up at the point of contact between the air and liquor causing external clogging. There are many designs of diffusers, using a wide variety of materials, currently available, all of which are subject to clogging. Also various porous diffuser media have been tried, but such media become internally clogged rather easily because of the minute passageways, and also clog from the outside. When clogging occurs the diffusers must be lifted out and cleaned. This becomes a serious operating problem, especially in the larger plants.

SUMMARY OF THE INVENTION

The present invention provides a diffuser which utilizes an open-bottomed chamber adapted to be disposed horizontally in submerged condition, said chamber having an air inlet at one end and having a row of air release ports along each side near the lower edges, air under pressure within the chamber filling the latter above the release ports and somewhat therebelow. Whenever there is a change in the liquor level inside the diffuser this automatically changes the amount of area of the ports which is in communication with the air, thus maintaining a critical velocity through the ports. In this way, even if upper portions of the ports should become clogged, there will be an automatic lowering of the liquid level in the diffuser to open up additional area below the clogged portions. Even if the release ports should become completely clogged, the air pressure would lower the liquid level within the diffuser sufficiently to allow release of air from beneath the lower edge of the diffuser. In addition, it is preferred to use a deflector spaced below the diffuser. This causes currents of liquid to flow upwardly along the outer surfaces of the sides of the reservoir to enhance the effectiveness of the release of air from the ports. In this way the diffusion of the proper amount of air is insured at all times.

A general object of the invention, therefore, is to provide a diffuser which is relatively non-clogging, in that air will always be released, and which, therefore, provides for efficient diffusion of the proper amounts of air at all times into the liquor.

A further object of the invention is to provide a diffuser which is so constructed as to maintain the required critical velocity of air through the ports automatically.

A further object of the invention is to provide a diffuser having relatively large release ports, as compared to standard practice, only portions of the large release ports being utilized for the release of air, the remaining area of the ports being available when needed to maintain the critical velocity.

A further object of the invention is to provide in the preferred embodiment, a deflector spaced below the open bottom of the diffuser to provide emergency air release slots between the deflector and the lower edges of the sides, said deflector also causing liquid currents to be directed upwardly along the outer surface of the sides of the diffuser. This aids in shearing off the air bubbles as they emerge from the air release ports, to thus reduce the size of the bubbles and produce small bubble diffusion.

BRIEF DESCRIPTION OF THE DRAWINGS

Referring more particularly to the drawings, in which the same reference numerals designate the same parts in all of the views.

DESCRIPTION OF THE PREFERRED EMBODIMENTS

Figure 1:
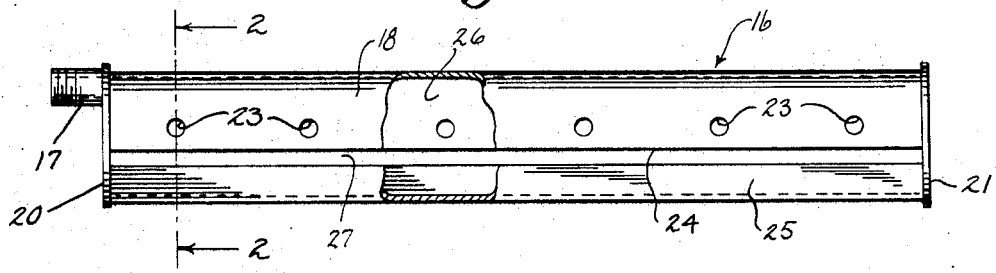
FIG. 1 is a side elevational view of a diffuser embodying the features of the present invention, part being broken away and shown in section.

Referring more particularly to the drawings, the numeral 10 designates a liquid treatment tank which, in the preferred embodiment, is an aeration tank forming part of a sewage treatment plant. An air compressor or pump 11 is adapted to deliver compressed air through conduits 12 and 13 to a vertical pipe 14 having a T-shaped fitting 15 on its lower end, which delivers air through balancing nozzles 17, to distribute the air from the pipe 14 uniformly into the two diffusers 16 which are illustrated. It is to be understood that the feed pipe 14 may feed any desired number of diffusers.

Each diffuser comprises a hoodlike member 18 having an open bottom 19 (see FIG. 2) and having its ends closed by end plates 20 and 21. The nozzle 17 communicates with an opening 22 in the end plate 20.

Each side of the hood portion 18 has a series of air ports 23 arranged in a horizontal line. In a typical embodiment the hood is 2 inches high, and the centers of the ports 23 are located about ½ inch above the lower edge 24 of each side of the hood. The ports are of somewhat larger size than is usual practice for ports of air diffusers, and in the preferred embodiment are ¼ inch in diameter.

Suitably supported by the lower portions of the end plates 20 and 21 is a deflector 25 which has its upper portion spaced below the lower edges 24 of the hood portion to provide side air spaces 26 for a purpose to be hereinafter described. In the preferred embodiment the deflector is V-shaped in cross section as is clear from FIG. 2. The spread of the V at its upper portion is such that liquid currents are directed by the deflector in an upward direction to brush past the outer surfaces of the side walls of the hood portion, the deflector preventing the liquid currents from acting within the hood. While the improved invention is advantageous without the deflector 24, nevertheless in the preferred embodiment the use of such deflector is desirable.

Operation

In operation, the pump or air compressor 11 is adjusted or sized to deliver a sufficient volume of air under pressure to the diffuser to meet the particular conditions. The pressure of the air must be equal to the hydrostatic pressure of the air must be equal to the hydrostatic pressure in the tank 10 in the region of the ports 23, plus an extra increment sufficient to force the air out through the ports 23, as indicated by the arrows (a), and into the liquor within the tank 10. The air pressure within the hood 18, therefore, lowers the liquid level L within the hood to a level somewhat below the upper portions of the openings 23. There is always a critical velocity required, depending upon the particular conditions in the tank. This critical velocity is different in different situations. The present invention is adapted to maintain this critical velocity automatically.

In a sewage tank of this type there will be plugging around the edges of the exposed portions of the openings 23 from the inside, due to dirty air. There will also be a buildup of foreign matter, such as iron or calcium, around the exposed portions of the openings, which occurs from the outside. This buildup occurs at the points of contact between water and the air. Such deposits will eventually fill up the upper portions of the openings 23. However, the air within the chamber 26, because its escape is being restricted, will cause a lowering of the liquid level from within the hood 18 to automatically open up sufficient additional area of the openings to maintain the required critical velocity for the particular conditions encountered. Should the ports 23 become completely filled up, after a long period of usage, the liquid level will automatically lower to a point in line with the lower edges 24 of the hood and will allow air to escape around said lower edges 24. Thus the diffuser will always operate to diffuse air into the liquor. This action will take place whether or not the deflector 25 is employed.

Figure 2:
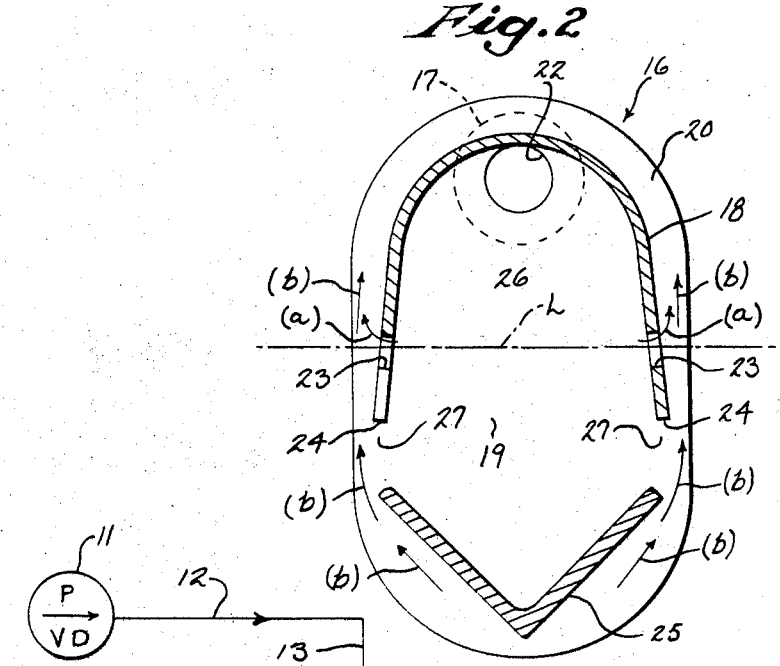
FIG. 2 is a sectional view taken on the line 2—2 of FIG. 1, the lower arrows indicating the flow of liquid current and the upper arrows indicating the air flow.
Figure 3:
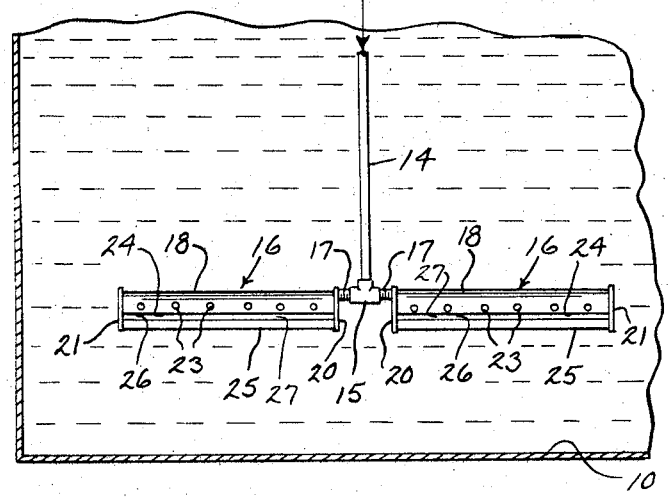
FIG. 3 is a fragmentary vertical sectional view through a sewage tank showing a submerged pair of aerators constructed in accordance with the present invention.

When the deflector 25 is used it is spaced below the lower edges 24 to maintain longitudinal air escape slots 27. This deflector also serves a further purpose. In an aeration plant the air is usually introduced along one side by the diffusers. This causes the contents of the tank to move rather rapidly in a circular path, creating currents of liquid which might have an effect in the open bottom 19 of the diffuser. By having a deflector positioned as shown in FIG. 2, the open bottom of the chamber 26 is protected and the currents are caused to flow upwardly along the sides, as indicated by the arrows (b). This action of the liquid currents brushing past the escaping air, indicated by the arrows (a), will shear off the air bubbles and reduce their size, and produce a desirable small bubble type of diffusion. It also creates an agitation which reduces the buildup of foreign matter around the openings.

It is apparent from the above that a very desirable diffuser has been provided which, while applicable to the diffusion of various gases in liquids, is particularly well suited for the diffusion of air into an aeration tank of a sewage treatment plant. It is also apparent that with the use of the present diffusers the amount of time which a diffuser can be operated without cleaning is increased many fold. As a matter of fact, the diffusers could operate indefinitely without cleaning. However, after all of the air ports become completely clogged, it is naturally desirable, when convenient, to open up these air ports.

What I claim is:

1. Sewage treatment apparatus having a liquid tank, having a source of compressed air, and having a conduit connected to said source and extending below the liquid level in the tank, the improvement comprising an open-bottomed hood-like diffuser disposed horizontally in said tank and having side walls with lower edges, a connection between an upper portion of said diffuser and said air conduit whereby air under pressure may enter the upper portion of said diffuser to lower the liquid level therein and create an air chamber above said liquid level, each of said side walls having a horizontal series of air release ports in communication with the lower portion of the air chamber, said source of compressed air including means to establish pressure in said chamber sufficiently in excess of the hydrostatic pressure in the region of the release port as to result in discharge of air from upper portions of the ports, and also sufficiently to cause automatic lowering of the liquid level in the diffuser to expose additional release port area as required, and a deflector having opposite upper edges supported in a position to extend in the same direction as and spaced below the lower edges of said side walls of the diffuser and in alignment with said lower edges to create emergency air release space between said lower edges of the diffuser and the opposite edges of the deflector, said deflector having upwardly diverging side walls to direct liquid currents upwardly along the outer surfaces of the side walls of the diffuser past the air release ports to enhance the effectiveness of the latter, said deflector extending the length of the horizontal series of air release ports.

2. Sewage treatment apparatus as claimed in claim 1 in which the deflector is V-shaped in cross-section.

References Cited

UNITED STATES PATENTS

| 1,098,190 | 5/1914 | Stone | 261—124 |
| 2,144,385 | 1/1939 | Nordell. | |
| 2,986,383 | 5/1961 | Lowry | 261—124 |
| 3,162,702 | 12/1964 | Yonner | 210—220 X |
| 3,193,260 | 7/1965 | Lamb | 210—220 X |

FOREIGN PATENTS

| 571,970 | 1/1958 | Italy. |

RONALD R. WEAVER, *Primary Examiner.*

U.S. Cl. X.R.

23—271; 210—220; 261—124